US012627942B2

(12) United States Patent
Lee

(10) Patent No.: US 12,627,942 B2
(45) Date of Patent: May 12, 2026

(54) VIRTUAL ENGINE SOUND CONTROL SYSTEM AND CONTROL METHOD THEREOF

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 246 days.

(21) Appl. No.: 18/522,712

(22) Filed: Nov. 29, 2023

(65) Prior Publication Data

US 2024/0196153 A1 Jun. 13, 2024

(30) Foreign Application Priority Data

Dec. 7, 2022 (KR) ........................ 10-2022-0169483

(51) Int. Cl.
*H04S 7/00* (2006.01)
*G10K 11/18* (2006.01)

(52) U.S. Cl.
CPC .............. *H04S 7/303* (2013.01); *G10K 11/18* (2013.01); *H04S 2400/11* (2013.01)

(58) Field of Classification Search
CPC ....................................................... H04S 7/303
See application file for complete search history.

(56) References Cited

U.S. PATENT DOCUMENTS 10,266,112 B1 * 4/2019 Lee ........................ B60W 20/00
2017/0238118 A1 * 8/2017 Bahne ...................... H04S 7/301 700/94
2021/0329399 A1 * 10/2021 Wang ....................... H04S 7/303
2024/0114308 A1 * 4/2024 Seefeldt .................. H04S 7/303

FOREIGN PATENT DOCUMENTS

KR 20190044292 A 4/2019

* cited by examiner

*Primary Examiner* — Ping Lee
(74) *Attorney, Agent, or Firm* — Novo TechIP International PLLC

(57) ABSTRACT

A virtual engine sound generating system and method are provided in which each of speakers outputting a virtual engine sound provides an intended optimal virtual engine sound to a driver by adjusting a time for a virtual engine sound to reach the driver and an amplitude of an engine sound that reaches the driver when the head position of the driver changes from a reference position. The system includes speakers provided in a vehicle to output the virtual engine sound, an engine sound generating unit generating the sound, and a controller calculating a head position of a driver based on state information of the driver's seat, adjusting a delay time at which the virtual engine sound is output and/or an amplification factor for each of the speakers based on the calculated head position, and outputting an adjusted delay time and/or amplification factor to the engine sound generating unit.

13 Claims, 5 Drawing Sheets

VIRTUAL ENGINE SOUND CONTROL SYSTEM AND CONTROL METHOD THEREOF

CROSS-REFERENCE TO RELATED APPLICATIONS

This application claims priority under 35 U.S.C. § 119 to Korean Patent Application No. 10-2022-0169483, filed on Dec. 7, 2022, in the Korean Intellectual Property Office, the disclosure of which is incorporated herein by reference in its entirety.

TECHNICAL FIELD

The following disclosure relates to a virtual engine sound generating system and a virtual engine sound controlling method, and in particular, to a virtual engine sound generating system and a virtual engine sound controlling method, in which each of a plurality of speakers outputting a virtual engine sound provides an intended optimal virtual engine sound to a driver by adjusting a time for a virtual engine sound to reach the driver and an amplitude of an engine sound that reaches the driver when the head position of the driver changes from a reference position.

BACKGROUND

Active sound design (ASD) synthesizes vehicle sounds using sound reinforcement techniques in order to change or improve sound inside and outside a vehicle.

Recently, as demand for eco-friendly engines has increased, the efficiency of engine systems has increased, but the auditory satisfaction given to consumers has decreased.

In addition, electric and fuel cell vehicles also produce high-pitched sound that general combustion engines do not have. Therefore, in order to satisfy the emotional quality of the engine sound to the consumer, the engine sound is generated or reinforced by an audio output unit by using the ASD.

Current electric vehicles have significantly less noise and vibration transmitted to the interior thanks to electric motors that rotate quietly and smoothly. Thus, driving sound of electric vehicles is very small and a process of moving in a vehicle may be considered boring.

Therefore, an electric vehicle ASD method has been developed to maximize driving immersion by adding auditory elements to electric vehicles. In this method, output torque of the electric vehicle is received and converted into an engine sound at a specific RPM, and then output to the interior through the audio output unit.

At this time, at an initial tuning stage, a virtual engine sound is set based on a reference position of the driver's seat and a reference angle of a backrest angle. However, when the driver moves the seat forward or backward or changes the backrest angle, the head position of the driver changes, and accordingly, an arrival distance and an engine sound volume of an initially set virtual engine sound may change.

As a result, the arrival distance and an engine sound volume for each speaker intended at the time of initial tuning change, thereby degrading quality of an engine sound experienced by the driver.

Therefore, it is required to develop a virtual engine sound system capable of optimally transmitting a virtual engine sound even when the driver's seat position and backrest angle change.

Korean Application Publication No. 10-2019-0044292 is an example of a related prior art document.

SUMMARY

An exemplary embodiment of the present invention is directed to providing a virtual engine sound generating system and a virtual engine sound controlling method, in which each of a plurality of speakers outputting a virtual engine sound provides an intended optimal virtual engine sound to a driver by adjusting a time for a virtual engine sound to reach the driver and an amplitude of an engine sound that reaches the driver when the head position of the driver changes from a reference position.

The present invention has the following features in order to solve the above problems.

In one general aspect, a virtual engine sound generating system includes: a plurality of speakers provided in a vehicle to output a virtual engine sound; an engine sound generating unit generating the virtual engine sound; and a controller calculating a head position of a driver based on state information of the driver's seat in the vehicle, adjusting at least one of a delay time at which the virtual engine sound is output and an amplification factor for each of the plurality of speakers based on the calculated head position, and outputting an adjusted one to the engine sound generating unit.

When adjusting the delay time, the controller may calculate a delay time for each of the plurality of speakers at which the virtual engine sounds output from the plurality of speakers simultaneously reach the calculated head position, and adjust each of the plurality of speakers based on the calculated delay time.

The state information of the driver's seat may include at least one of position information of the driver's seat in a front/rear direction, angle information between a backrest of the driver's seat and the seat, a length of the backrest, a length from the backrest to a center of a headrest of the driver's seat, and an angle between the backrest and the headrest.

When the driver's seat is located at a reference position and when a position at which a center line of the seat in the front/rear direction and a center line of the backrest in an up/down direction meet is (xd, yd, zref), the head position (PD) may be calculated through Equation (1) below.

$$P_D=(x_d, y_d+B\sin(\pi-\theta_S)+N\sin(\theta_N-\pi-\theta_S), z_{ref}+z_S+B\cos(\pi-\theta_S)-N\sin(\theta_N-\pi-\theta_S)-H) \quad \text{Equation (1)}$$

(wherein zS is a movement distance of the seat in the front/rear direction at zref, θS is the angle between the seat and the backrest, B is the length of the backrest, N is the length from the backrest to the center of the headrest, θN is a mounting angle of the backrest and the headrest, and H is a statistical value at which the head is located at the center of the headrest).

The plurality of speakers may include at least two or more of a front left speaker FL, a front right speaker FR, a rear left speaker RL, a rear right speaker RR, and a rearmost speaker SW, and the controller calculates the delay time dx through Equation (2) below.

$$d_x = \frac{\overline{P_x P_D} - \max_k \overline{P_k P_D}}{c} \quad \text{Equation (2)}$$

(wherein x, k∈{FL, FR, RL, RR, SW}, is the distance between the head position of the driver and each speaker, $$\max_k \overline{P_k P_D}$$

is a largest distance among the distances between the head position of the driver and each speaker, and c is a speed of sound waves in air).

The controller may set an offset, which is an additional delay time for the virtual engine sounds to reach in an intended order for each of the plurality of speakers based on the calculated delay time.

The controller may calculate a change in amplitude of the virtual engine sound generated as an arrival distance changes for each of the plurality of speakers when the calculated head position changes, and adjust an amplification factor of the virtual engine sound for each of the plurality of speakers based on the calculated amplitude change.

The controller may calculate the change in amplitude change U(PD) through Equation (3) below.

$$U(P_D) = \frac{1}{j\lambda}\int U_S \frac{e^{j2\pi\frac{1}{\lambda}R}}{R} ds \quad \text{Equation (3)}$$

(wherein U is a sound pressure, λ is a wavelength, s is surface coordinates of each speaker, and R is a distance from a surface of each speaker to the head position of the driver).

The controller may calculate the amplification factor Gx for each of the plurality of speakers through Equation (4) below.

$$G_x = A_x \frac{\overline{P_x P_T}}{\overline{P_x P_D}} \quad \text{Equation (4)}$$

(wherein x, k∈{FL, FR, RL, RR, SW}, PT is a preset reference head position of the driver, PD is a current head position of the driver, and Ax is the amplification factor for each speaker set at the preset reference head position of the driver).

The engine sound generating unit may include: a synthesizer generating an engine sound frequency in a tone or wavetable manner based on a driving speed of the vehicle; a plurality of amplifiers amplifying the engine sound frequencies received from the synthesizer for each of the plurality of speakers under the control of the controller; a plurality of equalizers respectively connected to the plurality of amplifiers to differentially increase the received engine sound frequencies to generate normalized engine sound frequencies having a uniform level; and a plurality of time delay units respectively connected to the plurality of equalizers to delay an output of the received engine sound frequency under the control of the controller and to transfer the engine sound frequency to a connected speaker.

In another general aspect, a method of controlling a virtual engine sound includes: a) calculating, by a controller, a head position of a driver based on state information of a driver's seat in a vehicle; b) calculating a delay time for outputting a virtual engine sound from each of the plurality of speakers so that the virtual engine sounds output from the plurality of speakers simultaneously reach the head position of the driver based on the calculated head position; c) calculating a change in amplitude according to a change in distance between the plurality of speakers and the head position of the driver based on the calculated head position; d) calculating an amplification factor for each of the plurality of speakers so that the virtual engine sound reaches the head position of the driver with a desired engine sound volume for each of the plurality of speakers based on the calculated change in amplitude; and e) performing a delay time and engine sound amplification on the virtual engine sound generated by the engine sound generating unit based on the delay time and the amplification factor calculated for each of the plurality of speakers so that the virtual engine sound is output from the corresponding speaker.

The state information of the driver's seat may include at least one of position information of the driver's seat in a front/rear direction, angle information between a backrest of the driver's seat and the seat, a length of the backrest, a length from the backrest to a center of a headrest of the driver's seat, and an angle between the backrest and the headrest.

The method may further include: between operation b) and operation c), b-1) calculating, by the controller, a final delay time by adding an offset set for each of the plurality of speakers to the calculated delay time.

In operation c), the controller may calculate a change in the distance between the plurality of speakers and the head position of the driver by comparing a distance between a preset reference head position of the driver and a current head position of the driver.

Other features and aspects will be apparent from the following detailed description, the drawings, and the claims.

DETAILED DESCRIPTION

In order to describe the present invention, the operational advantages of the present invention, and the objects achieved by the practice of the present invention, exemplary embodiments of the present invention are described.

Terms used in the present application are used only to describe specific exemplary embodiments, and are not intended to limit the present invention. A singular form may include a plural form if there is no clearly opposite meaning in the context. It will be further understood that the terms "comprises" or "have" used in this specification, specify the presence of stated features, numerals, components, parts, or a combination thereof, but do not preclude the presence or addition of one or more other features, numerals, components, parts, or a combination thereof.

In describing the present invention, if it is determined that a detailed description of a related known configuration or function may obscure the gist of the present invention, the detailed description will be omitted.

Figure 1:
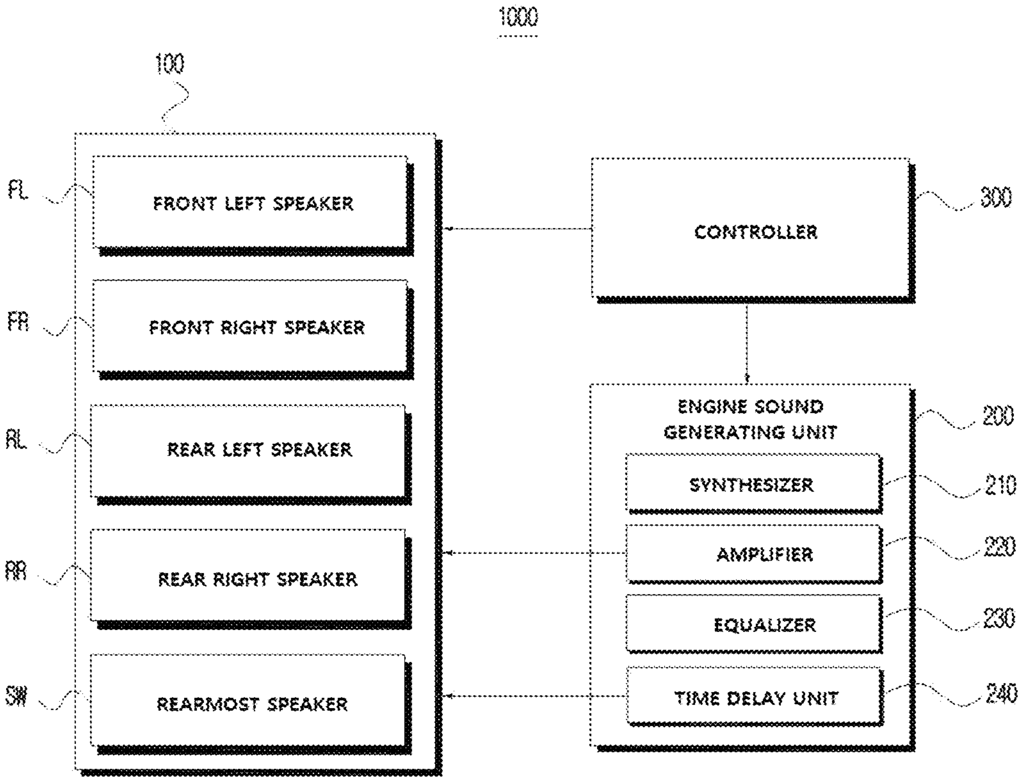
FIG. 1 is a diagram illustrating an internal configuration of a virtual engine sound generating system according to an exemplary embodiment of the present invention.

FIG. 1 is a diagram illustrating an internal configuration of a virtual engine sound generating system according to an exemplary embodiment of the present invention.

Referring to FIG. 1, a virtual engine sound generating system 1000 according to an exemplary embodiment of the present invention includes a plurality of speakers 100 provided in a vehicle and outputting a virtual engine sound, an engine sound generating unit 200 generating a virtual engine sound, and a controller 300 calculating a head position of a driver based on state information of the driver's seat in the vehicle, adjusting at least one of a delay time and an amplification factor of a virtual engine sound generated for each of the plurality of speakers based on the calculated head position, and outputting the adjusted one.

Here, the plurality of speakers 100 are provided in the vehicle and are configured to output a general acoustic sound and a virtual engine sound generated by the engine sound generating unit 200.

According to an example of the present invention, the plurality of speakers 100 may include a front left speaker FL, a front right speaker FR, a rear left speaker RL, a rear right speaker RR, and the rearmost speaker SW, and may be added or partially deleted according to settings.

The driver in the vehicle may listen to the virtual engine sound output from the plurality of speakers 100 and feel the sense of immersion in driving. In the present invention, the virtual engine sound is output to a point where the driver's head is currently located in order of arrival and volume of the engine sound for each target speaker.

That is, the driver moves the driver's seat in a front/rear direction or adjusts the angle of the backrest of the seat according to a body shape or preference. According to the adjustment of the position of the seat and the angle of the backrest, the head position of the driver may change and an arrival distance to each speaker may also change.

Accordingly, in the present invention, even if the head position of the driver changes, the changed head position of the driver may be calculated and a delay time and an amplification factor of the virtual engine sound may be adjusted for each speaker based on the calculated head position of the driver, thereby controlling a desired volume of the engine sound and arrival order.

Meanwhile, the engine sound generating unit 200 is provided to produce a virtual engine sound based on a driving speed of the vehicle and transfer the virtual engine sound to each of the plurality of speakers. The engine sound generating unit 200 includes a synthesizer 210 generating an engine sound frequency in a tone or wavetable manner based on a driving speed of the vehicle; a plurality of amplifiers 220 amplifying the engine sound frequencies received from the synthesizer 210 for each of a plurality of speakers under the control of the controller 300, a plurality of equalizers 230 respectively connected to the plurality of amplifiers 220 to differentially increase the received engine sound frequencies to generate normalized engine sound frequencies having a uniform level, and a plurality of time delay units 240 respectively connected to the plurality of equalizers 230 to delay an output of the received engine sound frequency under the control of the controller 300 and to transfer the engine sound frequency to a connected speaker 100.

Here, the amplifier 220 and the time delay unit 240 determine the amplification factor and delay time under the control of the controller 300, and the controller 300 calculates the head position of the driver and calculates the amplification factor and delay time for each speaker based on the calculated head position of the driver.

In addition, an offset, which is an additional delay time for differentiating the order of arrival for each target speaker, may be set in the time delay unit 240. An engine of an internal-combustion engine vehicle is located in the front, and in order to increase the sense of reality, the virtual engine sound output from the front left speaker FL and the front right speaker FR has to reach the driver first.

That is, the delay time calculated for each of the plurality of speakers refers to a time at which the virtual engine sound output from each speaker reaches the driver at the same time, and the offset is an additional delay time for differentiating the arrival order from the delay time at which the virtual engine sound reaches each speaker at the same time.

Therefore, this offset setting may be performed in the time delay unit 240 under the control of the controller 300, and may be stored as a default value in the time delay unit 240 from the beginning, if necessary.

Meanwhile, as described above, the controller 300 calculates the head position of the driver based on the state information of the driver's seat in the vehicle, adjusts at least one of the delay time and amplification factor of the virtual engine sound for each of the plurality of speakers based on the calculated head position.

When adjusting the delay time, the controller 300 calculates the delay time for each of the plurality of speakers so that the virtual engine sounds output from the plurality of speakers 100 simultaneously reach the calculated head position, and adjusts the delay time based on the calculated delay time.

In addition, a virtual engine sound is output for each speaker by adding the aforementioned offset to the delay time calculated for each speaker.

In this manner, the controller 300 calculates the delay time based on the state information of the driver's seat. At this time, the state information of the driver's seat includes the position information of the driver's seat and angle information of the backrest of the driver's seat. More precisely, the position information of the driver's seat is position information of the driver's seat in the front/rear direction, and the angle information of the backrest of the driver's seat refers to angle information between the backrest of the driver's seat and the seat.

In addition, the state information of the driver's seat may include a length of the backrest, a length from the backrest to the center of a headrest of the driver's seat, an angle between the backrest and the headrest, and the like.

Meanwhile, the controller 300 controls the desired volume of engine sound, that is, the amplification factor of engine sound for each of a plurality of speakers, based on the head position of the driver. As for the amplification factor of engine sound, a reference position of the driver's head is set in an initial tuning state of the virtual engine sound generating system 1000, and the amplification factor for each speaker is set to the reference position.

However, when the driver moves the seat in the front/rear direction or changes the angle of the backrest, the head position of the driver is changed from the reference head position. When a specific speaker 100 and the head position of the driver are away from the existing reference position, the amplitude of the engine sound is reduced and reaches the driver, and when the specific speaker 100 and the head position of the driver are close to the existing reference position, the amplitude of the engine sound reaches to be greater than the desired amplitude.

Accordingly, the controller 300 adjusts the amplification factor of the engine sound according to the change in the head position of the driver so that the desired volume of the engine sound is transmitted to the driver.

Hereinafter, a process of calculating the head position of the driver, a process of calculating a delay time for each of a plurality of speakers, and a process of calculating an amplification factor of the controller 300 will be described in detail.

Figure 2:
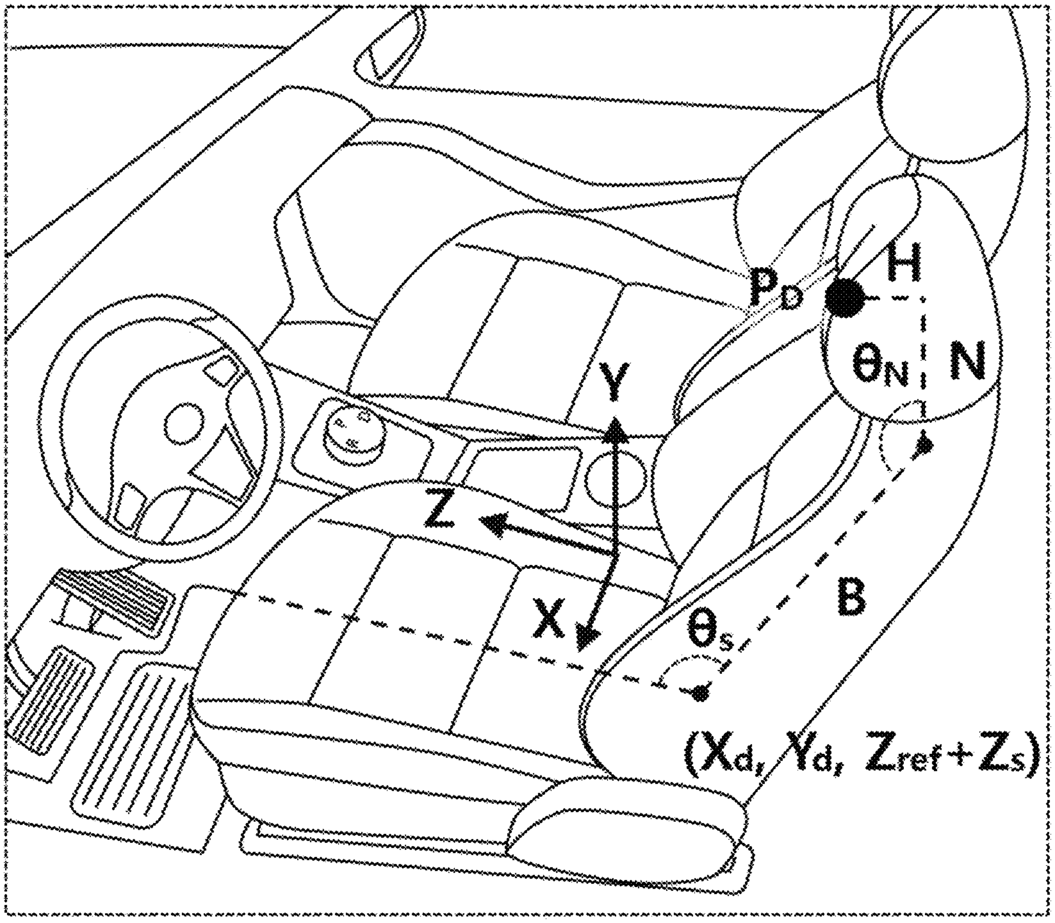
FIG. 2 is a diagram illustrating a way in which a controller calculates a head position of the driver according to an exemplary embodiment of the present invention.
Figure 3:
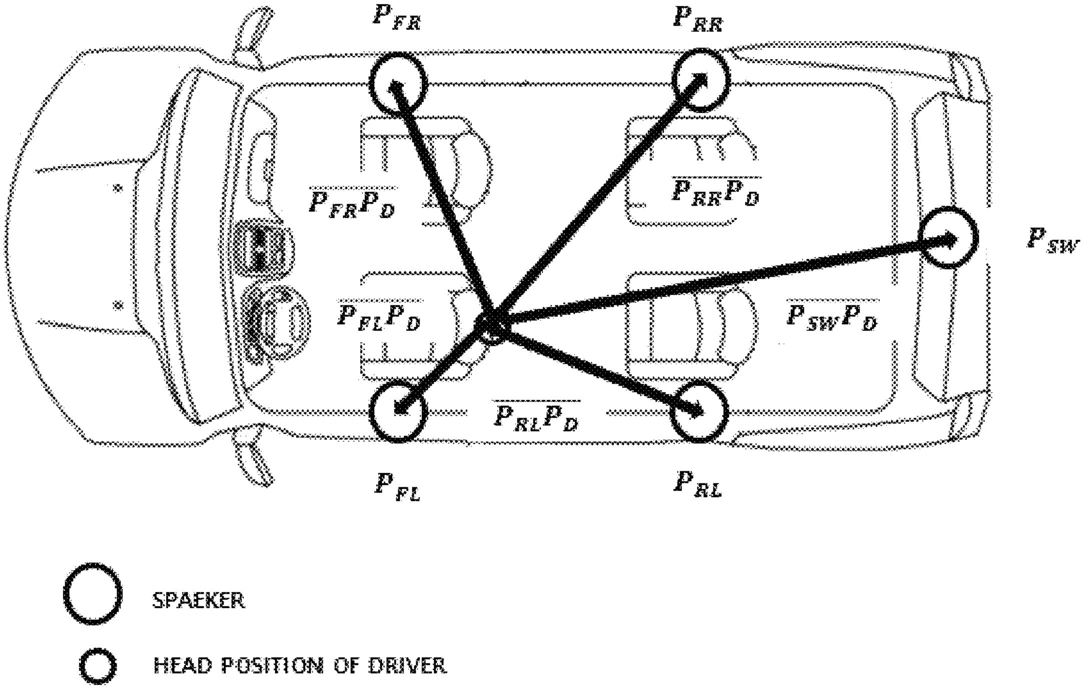
FIG. 3 is a diagram illustrating distances between a head position of the driver and each of a plurality of speakers according to an exemplary embodiment of the present invention.
Figure 4:
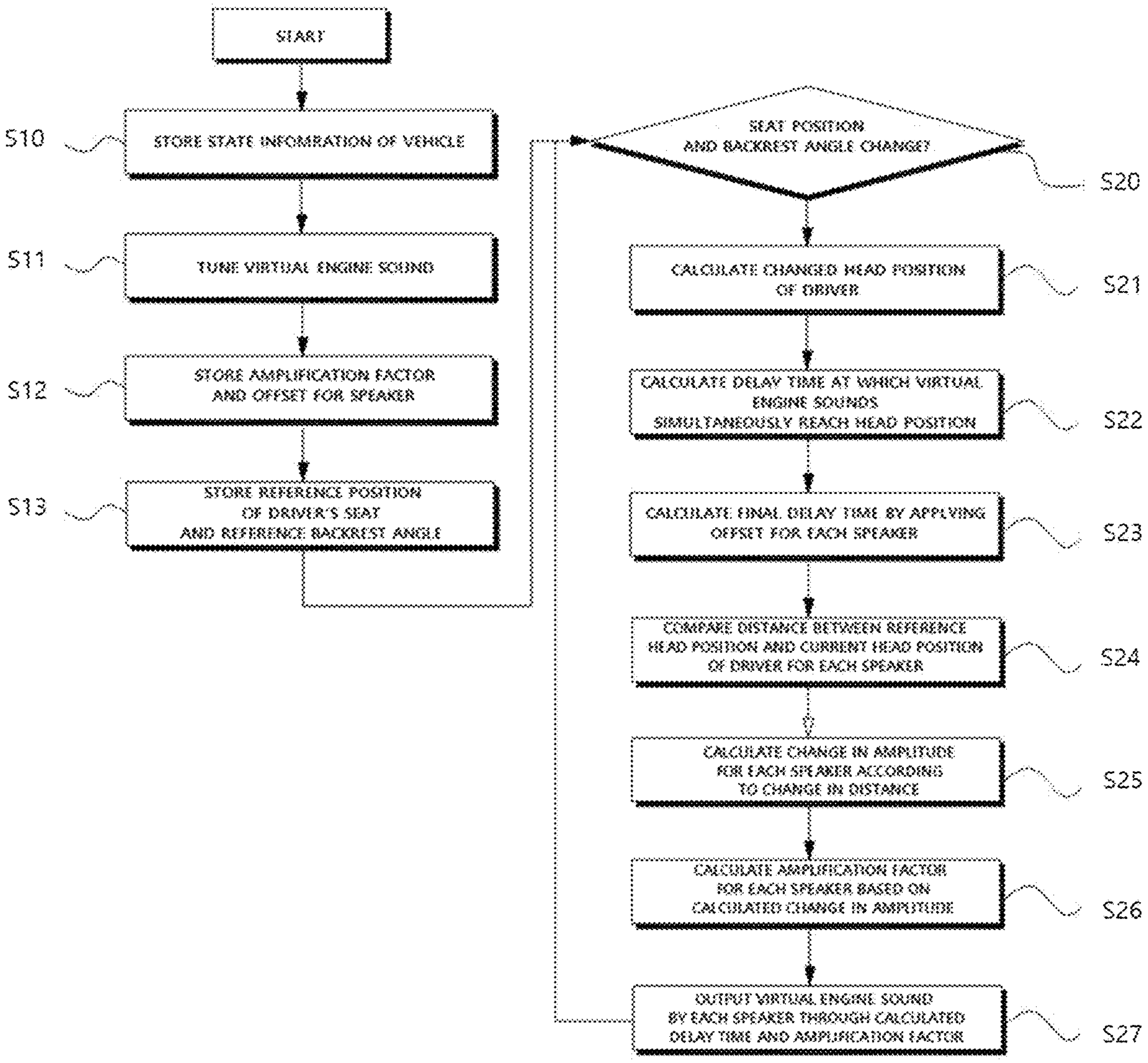
FIG. 4 is a diagram illustrating a control process of a virtual engine sound generating system according to an exemplary embodiment of the present invention.

FIG. 2 is a diagram illustrating a way in which the controller calculates a head position of a driver according to an exemplary embodiment of the present invention, and FIG. 4 is a diagram illustrating distances between a head position of the driver and a plurality of speakers according to an exemplary embodiment of the present invention.

The controller 300 calculates the head position of the driver as follows. When the driver's seat is located at a reference position as shown in FIG. 4, when a position at which a center line of the seat in the front/rear direction and a center line of the backrest in an up/down direction meet is (xd, yd, zref), and when the driver's seat moves from the corresponding reference position by zS in the front/rear direction and the angle of the backrest, that is, the angle between the backrest of the driver's seat and the driver's seat is OS, the head position PD of the driver is as shown in Equation 1 below.

$$P_D=(x_d, y_d+B\sin(\pi-\theta_S)+N\sin(\theta_N-\pi-\theta_S), z_{ref}+z_S+B\cos(\pi-\theta_S)-N\sin(\theta_N-\pi-\theta_S)-H) \quad \text{Equation (1)}$$

At this time, zS is a movement distance of the seat in the front/rear direction at zref, θS is the angle between the seat and the backrest, B is the length of the backrest, N is the length from the backrest to the center of the headrest, θN is a mounting angle of the backrest and the headrest, and H is a statistical value at which the head is located at the center of the headrest.

Here, B, N, θN, and H are default values that are previously set and stored, but may be changed according to settings. If they are changed, the controller 300 may store the changed values and then call and calculate it when calculating the head position of the driver.

In addition, zS and θS are received by the controller 300 through a separate sensor provided in the vehicle, and since the sensor is a known technology, a separate description thereof will be omitted.

Accordingly, when the seat position of the seat or the angle of the backrest changes, the head position of the driver is calculated through Equation (1), and the delay time dx should be adjusted for each speaker as shown in Equation (2) below in order to match the phases of the outputs of the plurality of speaker based on the calculated head position of the driver.

$$d_x = \frac{\overline{P_xP_D} - \max\limits_k \overline{P_kP_D}}{c} \quad \text{Equation (2)}$$

At this time, x, k∈{FL, FR, RL, RR, SW}, $\overline{P_xP_D}$ is the distance between the head position of the driver and each speaker, $$\max_k \overline{P_kP_D}$$

is a largest distance among the distances between the head position of the driver and each speaker, and c is a speed of sound waves in air.

Of course, PFL, PFR, PRL, PRR, PSW are defined as the center point position of each speaker.

Meanwhile, in order to adjust the amplification factor of the controller 300 described above, it is necessary to calculate the change in amplitude of the engine sound due to the changed head position of the driver, and the change in amplitude U(PD) may be calculated through Equation (3) below.

$$U(P_D) = \frac{1}{j\lambda}\int U_S \frac{e^{j2\pi\frac{1}{\lambda}R}}{R} ds \quad \text{Equation (3)}$$

Here, U is a sound pressure, λ is a wavelength, s is surface coordinates of each speaker, and R is a distance from a surface of each speaker to the head position of the driver.

In this way, when the amplitude change U(PD) is calculated for each speaker, the controller 300 calculates the amplification factor Gx for compensation by an amplitude change value for each speaker through Equation (4) below.

$$G_x = A_x\frac{\overline{P_xP_T}}{\overline{P_xP_D}} \quad \text{Equation (4)}$$

At this time, x, k∈{FL, FR, RL, RR, SW}, PT is a preset reference head position of the driver, PD is a current head position of the driver, and Ax is the amplification factor for each speaker set at the preset reference head position of the driver.

In this way, the controller 300 calculates the current head position of the driver, calculates the change in the delay time and the amplitude of the engine sound through the changed arrival distance between the driver's heads for each of the plurality of speakers, and adjusts the delay time and the amplification factor of the engine sound based on the calculated delay time and the change in amplitude of the engine sound.

As shown in FIG. 1 described above, the controller 300 adjusts the amplification factor through the control of the amplifier 220 and adjusts the delay time through the time delay unit 240.

FIG. 4 is a diagram illustrating a control process of a virtual engine sound generating system according to an exemplary embodiment of the present invention.

Referring to FIG. 4, a control process of the controller in the virtual engine sound generating system according to an exemplary embodiment of the present invention may be largely divided into a tuning process, which is an initial setting process of the virtual engine sound generating system, and a time delay and amplification factor adjustment process according to changes in the position of the driver's seat and the angle of the backrest after tuning.

First, in the tuning process, a process in which the controller 300 stores state information set in advance among the vehicle state information is performed (S10), and a virtual engine sound tuning process is performed by setting the engine sound generating unit 200 (S11).

In addition, the controller 300 sets and stores amplification factors and offsets for each of a plurality of speakers (S12), and stores the reference position of the driver's seat and a reference backrest angle (S13).

Meanwhile, when the tuning process (S10, S11, S12, S13) is completed, after tuning, a process of adjusting a time delay and amplification factor according to changes in the driver's seat position and backrest angle is performed. First, the controller 300 receives sensing information from a separate sensor to determine whether the driver's seat position and backrest angle have changed from the reference position and reference backrest angle (S20), and it is determined that the driver's seat position and backrest angle have changed, the controller 300 calculates the head position of the driver based on the current position of the driver's seat and the backrest angle, and the state information of the vehicle stored in operation S10 (S21).

In addition, the controller 300 calculates a delay time at which the virtual engine sound may reach simultaneously for each of the plurality of speakers based on the head position of the driver (S22), and calculates a final delay time by calling the offset for each of the plurality of speakers stored in operation S12 and adding called offset to the calculated delay time (S23).

In addition, the controller 300 compares the distances between the plurality of speakers and the reference head position of the driver during the tuning process and the distances between the current head position of the driver and the plurality of speakers (S24) to calculate a change in amplitude for each speaker according to the change in distance (S25), calculates an amplification factor to be compensated for the desired volume of the engine sound for each of the plurality of speakers based on the calculated change in amplitude (S26), and controls a corresponding speaker to output a virtual engine sound by applying the delay time and amplification factor for each of the plurality of speakers according to operations S23 and S26 (S27).

Figure 5:
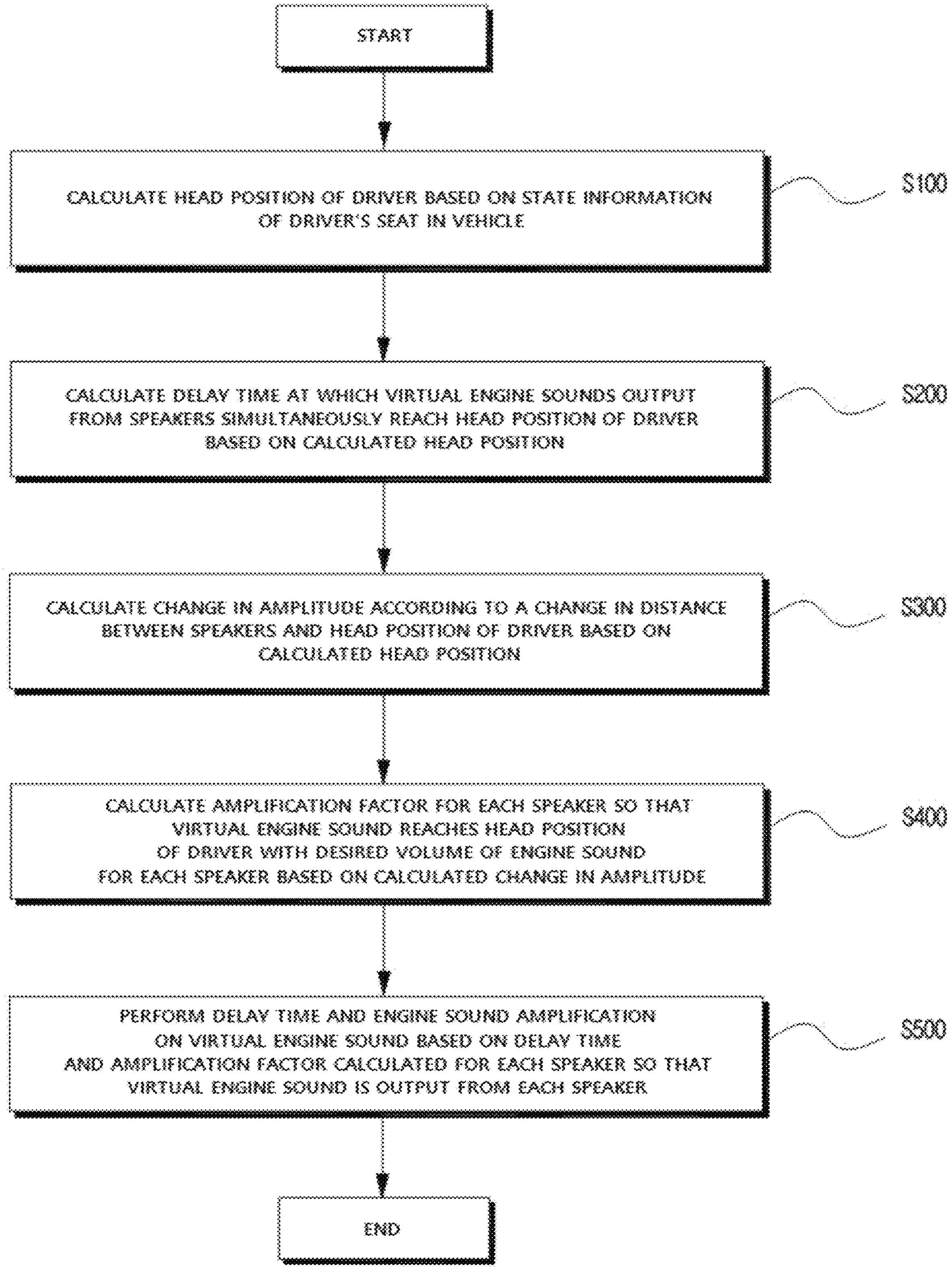
FIG. 5 is a flowchart illustrating a control method of a virtual engine sound generating system according to an exemplary embodiment of the present invention.

FIG. 5 is a flowchart illustrating a control method of a virtual engine sound generating system according to an exemplary embodiment of the present invention.

Referring to the drawings, a method of controlling a virtual engine sound according to an exemplary embodiment of the present invention includes an operation (S100) of calculating, by the controller 300, a head position of a driver based on state information of a driver's seat in a vehicle, an operation (S200) of calculating a delay time at which virtual engine sounds output from the plurality of speakers 100 simultaneously reach the head position of the driver based on the calculated head position, an operation (S300) of calculating a change in amplitude according to a change in distance between a plurality of speakers 100 and the head position of the driver based on the calculated head position, an operation (S400) of calculating an amplification factor for each of the plurality of speakers so that the virtual engine sound reaches the head position of the driver with a desired volume of the engine sound for each of the plurality of speakers based on the calculated change in amplitude, and an operation (S500) of performing a delay time and engine sound amplification on the virtual engine sound generated by the engine sound generating unit based on the delay time and the amplification factor calculated for each of the plurality of speakers so that the virtual engine sound is output from the corresponding speaker 100.

Here, the state information of the driver's seat includes at least one of position information of the driver's seat in a front/rear direction, angle information between a backrest of the driver's seat and the seat, a length of the backrest, a length from the backrest to a center of a headrest of the driver's seat, and an angle between the backrest and the headrest.

In addition, when the head position of the driver is calculated in operation S100, the controller 300 calculates the head position of the driver through Equation (1), and when the head position of the driver is calculated, the controller calculates a delay time at which the virtual engine sounds output from the plurality of speakers 100 simultaneously reach the head position of the driver based on the calculated head position (S200), and after the operation S200, the controller 300 calculates a final delay time by adding the offset set for each of the plurality of speakers to the calculated delay time.

At this time, in the operation of calculating the delay time, the delay time is calculated through the aforementioned Equation (2), and the final delay time is calculated by adding the preset offset for each of a plurality of speakers to the calculated delay time.

In addition, in operation S300, the change in amplitude according to a change in the distances between the plurality of speakers 100 and the head position of the driver is calculated based on the calculated head position. Here, the change in distances between the plurality of speakers and the head position of the driver may be calculated by comparing the distance between the preset reference head position of the driver and the current head position of the driver, and is calculated through the aforementioned Equation (3).

Meanwhile, in operation S400, the amplification factor for each of the plurality of speakers is calculated based on the calculated change in amplitude so that the virtual engine sound reaches the head position of the driver at the desired volume of the engine sound for each speaker, and the amplification factor may be calculated through the aforementioned equation (4).

According to the present invention, even if the driver changes the position of the seat and the angle of the backrest, the desired optimal virtual engine sound may be transferred by calculating the changed head position of the driver and controlling the delay time and the amplification factor of the virtual engine sound for each of the plurality of speakers.

Accordingly, the sense of driving immersion may be improved, and the emotional quality of the vehicle may be increased by providing various auditory consumer experiences by delivering sound designed to suit the purpose.

Although the exemplary embodiments of the present invention have been described above, the present invention is not limited to the specific exemplary embodiments described above. That is, those skilled in the art to which the present invention pertains may make many changes and modifications to the present invention without departing from the spirit and scope of the appended claims, and all such appropriate changes and modifications are equivalents and should be considered to fall within the scope of the present invention.

What is claimed is:

1. A virtual engine sound generating system comprising:

a plurality of speakers provided in a vehicle and configured to output a virtual engine sound;

an engine sound generating unit configured to generate a signal to each of the plurality of speakers to control the plurality of speakers to output the virtual engine sound; and a controller configured to calculate a head position of a driver based on state information of a driver's seat in the vehicle, to adjust a delay time at which the virtual engine sound is output and an amplification factor, based on calculating a change in amplitude, for each of the plurality of speakers based on the calculated head position, and to output an adjusted for at least one of the delay time and the amplification factor to the engine sound generating unit, wherein, between calculating the delay time and calculating the change in amplitude, a final delay time is calculated, by the controller, by adding an offset set for each of the plurality of speakers to the calculated delay time.

2. The virtual engine sound generating system of claim 1, wherein, when adjusting the delay time, the controller is configured to calculate a delay time for each of the plurality of speakers at which the virtual engine sounds output from the plurality of speakers simultaneously reach the calculated head position, and to adjust each of the plurality of speakers based on the calculated delay time.

3. The virtual engine sound generating system of claim 2, wherein the state information of the driver's seat includes at least one of position information of the driver's seat in a front/rear direction, angle information between a backrest of the driver's seat and the seat, a length of the backrest, a length from the backrest to a center of a headrest of the driver's seat, and an angle between the backrest and the headrest.

4. The virtual engine sound generating system of claim 3, wherein, when the driver's seat is located at a reference position and when a position at which a center line of the seat in the front/rear direction and a center line of the backrest in an up/down direction meet is $(x_d, y_d, z_{ref})$, the head position $(P_D)$ is calculated through Equation (1) below:

$$P_D=(x_d, y_d+B\sin(\pi-\theta_S)+N\sin(\theta_N-\pi-\theta_S), z_{ref}+z_S+B\cos(\pi-\theta_S)-N\sin(\theta_N-\pi-\theta_S)-H) \quad \text{Equation (1)}$$

wherein zs is a movement distance of the seat in the front/rear direction at $z_{ref}$, $\theta_S$ is the angle between the seat and the backrest, B is the length of the backrest, N is the length from the backrest to the center of the headrest, $\theta_N$ is a mounting angle of the backrest and the headrest, and H is a statistical value at which the head is located at the center of the headrest.

5. The virtual engine sound generating system of claim 4, wherein the plurality of speakers include at least two or more of a front left speaker FL, a front right speaker FR, a rear left speaker RL, a rear right speaker RR, and a rearmost speaker SW, and the controller is configured to calculate a delay time dx through Equation (2) below:

$$d_x = \frac{\overline{P_xP_D} - \max_k \overline{P_kP_D}}{c} \quad \text{Equation (2)}$$

wherein x, k∈{FL, FR, RL, RR, SW}, $\overline{P_xP_D}$ is the distance between the head position of the driver and each speaker, $$\max_k \overline{P_xP_D}$$

is a largest distance among the distances between the head position of the driver and each speaker, and c is a speed of sound waves in air.

6. The virtual engine sound generating system of claim 5, wherein the controller is configured to set an offset (OFFSET), which is an additional delay time for the virtual engine sounds to reach in an intended order for each of the plurality of speakers based on the calculated delay time.

7. The virtual engine sound generating system of claim 5, wherein the controller is configured to calculate a change in amplitude of the virtual engine sound generated as an arrival distance changes for each of the plurality of speakers when the calculated head position changes, and to adjust an amplification factor of the virtual engine sound for each of the plurality of speakers based on the calculated amplitude change.

8. The virtual engine sound generating system of claim 7, wherein the controller is configured to calculate the change in amplitude change $U(P_D)$ through Equation (3) below:

$$U(P_D) = \frac{1}{j\lambda}\int U_S \frac{e^{j2\pi\frac{1}{\lambda}R}}{R} ds \quad \text{Equation (3)}$$

wherein U is a sound pressure, λ is a wavelength, s is surface coordinates of each speaker, and R is a distance from a surface of each speaker to the head position of the driver.

9. The virtual engine sound generating system of claim 8, wherein the controller is configured to calculate an amplification factor Gx for each of the plurality of speakers through Equation (4) below:

$$G_x = A_x \frac{\overline{P_xP_T}}{\overline{P_xP_D}} \quad \text{Equation (4)}$$

wherein x, k∈{FL, FR, RL, RR, SW}, $P_T$ is a preset reference head position of the driver, $P_D$ is a current head position of the driver, and Ax is the amplification factor for each speaker set at the preset reference head position of the driver.

10. The virtual engine sound generating system of claim 1, wherein the engine sound generating unit includes:

a synthesizer configured to generate an engine sound frequency in a tone or wavetable manner based on a driving speed of the vehicle;

a plurality of amplifiers configured to amplify the engine sound frequencies received from the synthesizer for each of the plurality of speakers under the control of the controller;

a plurality of equalizers respectively connected to the plurality of amplifiers and configured to differentially increase the received engine sound frequencies to generate normalized engine sound frequencies having a uniform level; and a plurality of time delay units respectively connected to the plurality of equalizers and configured to delay an output of the received engine sound frequency under the control of the controller and to transfer the engine sound frequency to a connected speaker.

11. A method of controlling a virtual engine sound, the method comprising:

calculating, by a controller, a head position of a driver based on state information of a driver's seat in a vehicle;

calculating a delay time for outputting a virtual engine sound from each of a plurality of speakers so that the virtual engine sounds output from the plurality of speakers simultaneously reach the head position of the driver based on the calculated head position;

calculating a change in amplitude according to a change in distance between the plurality of speakers and the head position of the driver based on the calculated head position;

calculating an amplification factor for each of the plurality of speakers so that the virtual engine sound reaches the head position of the driver with a desired engine sound volume for each of the plurality of speakers based on the calculated change in amplitude; and performing a delay time and engine sound amplification on signals generated by an engine sound generating unit for controlling the virtual engine sound outputted by each of the plurality of speakers based on the delay time and the amplification factor calculated for each of the plurality of speakers, wherein, between calculating the delay time and calculating the change in amplitude, a final delay time is calculated by adding an offset set for each of the plurality of speakers to the calculated delay time.

12. The method of claim 11, wherein the state information of the driver's seat includes at least one of position information of the driver's seat in a front/rear direction, angle information between a backrest of the driver's seat and the seat, a length of the backrest, a length from the backrest to a center of a headrest of the driver's seat, and an angle between the backrest and the headrest.

13. The method of claim 12, wherein in calculating the change in amplitude, the controller calculates a change in the distance between the plurality of speakers and the head position of the driver by comparing a distance between a preset reference head position of the driver and a current head position of the driver.

* * * * *